United States Patent
Gisep

(10) Patent No.: US 11,043,915 B2
(45) Date of Patent: Jun. 22, 2021

(54) ROOF PANEL, ROOF ASSEMBLY AND ROOF

(71) Applicant: g-neration.energy AG, Thun (CH)

(72) Inventor: Claudio Gisep, Oberhofen (CH)

(73) Assignee: g-neration.energy AG, Thun (CH)

( * ) Notice: Subject to any disclaimer, the term of this patent is extended or adjusted under 35 U.S.C. 154(b) by 0 days.

(21) Appl. No.: 16/688,249

(22) Filed: Nov. 19, 2019

(65) Prior Publication Data
US 2020/0162014 A1    May 21, 2020

(30) Foreign Application Priority Data

Nov. 19, 2018 (EP) .................................... 18207114

(51) Int. Cl.
*H02S 20/25* (2014.01)
*H02S 30/10* (2014.01)

(52) U.S. Cl.
CPC .............. *H02S 20/25* (2014.12); *H02S 30/10* (2014.12)

(58) Field of Classification Search
CPC ................................ H02S 20/25; H02S 30/10
See application file for complete search history.

(56) References Cited

U.S. PATENT DOCUMENTS

| | | | |
|---|---|---|---|
| 5,143,556 A * | 9/1992 | Matlin | H02S 20/10 136/244 |
| 6,370,828 B1 * | 4/2002 | Genschorek | F24S 25/632 52/200 |
| 8,720,131 B2 * | 5/2014 | Urban | H02S 20/24 52/173.3 |
| 8,984,818 B2 * | 3/2015 | McPheeters | H02S 20/20 52/173.3 |
| 10,316,879 B2 * | 6/2019 | Jun | F24S 25/634 |
| 2007/0157963 A1 * | 7/2007 | Metten | F24S 25/632 136/251 |
| 2011/0147553 A1 * | 6/2011 | Ostermeier | F24S 25/634 248/223.41 |

(Continued)

FOREIGN PATENT DOCUMENTS

| | | | | |
|---|---|---|---|---|
| EP | 1734588 A2 | * | 12/2006 | F24S 25/35 |
| JP | 2005155039 A | * | 6/2005 | F24S 20/67 |

(Continued)

OTHER PUBLICATIONS

European search report and opinion for Application No. 18207114.2 (8 pages). (Year: 2019).*

(Continued)

*Primary Examiner* — Rodney Mintz
(74) *Attorney, Agent, or Firm* — Nadya Reingand; Yan Hunkin

(57) ABSTRACT

Roof panel comprising a photovoltaic module having a top surface, a bottom surface and lateral edges, and at least one rib fixedly connected to the photovoltaic module and transversely, preferably perpendicularly, projecting away from the bottom surface and extending along a lateral edge of the photovoltaic module. The height (h, h1, h2) of the at least one rib increases, preferably continuously increases, in direction along the lateral edge, such that the lower edge of the at least one rib is inclined with respect to the bottom surface and/or the top surface of the photovoltaic module.

17 Claims, 5 Drawing Sheets

(56) References Cited

U.S. PATENT DOCUMENTS

| | | | |
|---|---|---|---|
| 2011/0174353 A1* | 7/2011 | Urban | F24S 25/632 |
| | | | 136/244 |
| 2012/0085394 A1* | 4/2012 | McPheeters | H02S 30/10 |
| | | | 136/251 |
| 2012/0102854 A1* | 5/2012 | Meier | H02S 20/23 |
| | | | 52/173.3 |
| 2012/0145227 A1* | 6/2012 | Jun | F24S 25/634 |
| | | | 136/251 |
| 2013/0240008 A1* | 9/2013 | Baker | F24S 25/632 |
| | | | 136/244 |
| 2020/0224407 A1* | 7/2020 | Ng | E04B 1/40 |

FOREIGN PATENT DOCUMENTS

| | | | | |
|---|---|---|---|---|
| WO | WO-2011114078 A2 * | 9/2011 | | F24S 25/67 |
| WO | WO-2012119162 A1 * | 9/2012 | | F24S 25/33 |
| WO | WO-2014076954 A1 * | 5/2014 | | F24S 20/67 |

OTHER PUBLICATIONS

European search report and opinion for Application No. 19209547.9 (9 pages). (Year: 2020).*

* cited by examiner

ROOF PANEL, ROOF ASSEMBLY AND ROOF

FIELD OF INVENTION

The invention relates to a roof panel and to a roof assembly or to a roof and to a method of installing a roof assembly or a roof.

BACKGROUND

In the course of rising tendency towards renewable energy systems, the roofs of private houses, company buildings and also public buildings are provided with photovoltaic modules. Thereby, the photovoltaic modules are mounted above the existing roof, i.e. they cover the roof at least partially, mainly on the south side of the roof.

It is also known in prior art to form the roof itself from photovoltaic modules, i.e. the photovoltaic modules no longer cover an existing roof but form the roof directly. With such a solution material and costs may be saved.

However, it is difficult to mount photovoltaic modules without having any flat base. It is known from prior art to use longitudinal supporting profiles distanced from each other. The photovoltaic modules are laid onto the supporting profiles in order to cover the area between the profiles.

An important requirement is the tightness or waterproofness of such roof constructions. In known roofing systems this object is not satisfactorily solved or the solutions are too complicated both for its manufacturing and during mounting. In many cases, water ingresses into the transition area between photovoltaic module and supporting profile or between neighbouring modules. This is the area in which two adjacent modules face each other thereby forming a small gap.

SUMMARY

The object of the present invention is to provide a roof panel that guarantees maximal tightness and waterproofness, respectively, and that can be easily manufactured and mounted to supporting profiles. The laying procedure of such roof panels should be easy and reliable. The construction should be simple and low-cost.

The object is achieved by means of a roof panel comprising
- a photovoltaic and/or laminate module having a top surface, a bottom surface and lateral edges, and
- at least one rib fixedly connected to the photovoltaic and/or laminate module and transversely, preferably perpendicularly, projecting away from the bottom surface and extending along a lateral edge of the photovoltaic and/or laminate module.

The rib(s) of the roof panel is/are designed such that they can be inserted or mounted into a supporting profile (of a roof construction), which will be described later. The installation of the roof is efficiently simplified.

One major advantage of the current invention is that the ribs are mounted to the module. This means that if modules of different types are used for one roof, the ribs will automatically be different if needed: each module has the type of rib it needs. Moreover, the substructure of the roof, such a supporting profile or battens, does not have to be tailor-made to the types of modules used.

In order to further improve the waterproofness, the rib(s) according to the invention may be designed such that its bottom surface is inclined with respect to the bottom or top surface of the module.

The fact that the rib forms an obstacle or chicane for the (rain) water makes the inventive panel especially waterproof. As will be described below, the lower edge of the rib may abut against a supporting profile, which preferably is designed with side wall (portions). In the latter case the rib is partially accommodated within the profile and the path for the water in order to ingress will be (in cross-section of the profile and rib) a snake-like path. The snake-like path or chicane minimizes the probability of water or even moisture engrossing through the roof construction.

The at least one rib extends in the region of and along a lateral edge of the photovoltaic and/or laminate module. The rib may be e.g. flush with that lateral edge, but—alternatively—may be also inwardly distanced from that lateral edge so that a channel is formed between two neighbouring ribs to let water flow down the roof.

The lower edge or bottom surface of the rib is preferably a continuous straight surface, such that the rib abuts along its entire length against a supporting profile of the roof construction.

The ribs also make the module stiffer so that less support is needed, thus saving costs on the substructure (material and the mounting thereof) and/or it makes the roof more resilient thus making the roof panels last longer by taking away load from the laminate, the solar cells and their interconnectors.

The rib thus has three main functions: (1) it is part of the supporting construction, i.e. the roof panel is supported via the ribs; (2) makes the roof panels stiffer and (3) optimizing the tightness, particularly waterproofness of the roof.

It is of course preferred to have a first rib arranged in the region of and extending along a first lateral edge and a second rib in the region of and extending along a second lateral edge, which is opposed to the first lateral edge. Preferably, first and second ribs run essentially parallel to each other. However, particularly in the case of border panels (used at the margins of the roof) it is also possible to use panels with only one rib.

The invention is not restricted to roof panels comprising photovoltaic modules but is also applicable to roof panels comprising—so called—blind modules, i.e. modules that have no solar cells but are (also) formed from a laminate. A laminate is a plate or flat panel build up from at least two layers that are laminated together. Such blind modules are usually mounted on the north side of the roof. The term "photovoltaic and/or laminate module" therefore comprises: photovoltaic module, laminate module and/or photovoltaic laminate module.

In a preferred embodiment the height of the at least one rib increases, preferably continuously increases, in direction along the lateral edge, such that the lower edge of the at least one rib is inclined with respect to the bottom surface and/or the top surface of the photovoltaic and/or laminate module or curved, preferably concave curved, with respect to the bottom surface and/or the top surface of the photovoltaic and/or laminate module. The height is measured perpendicular to the bottom surface and/or the top surface of the photovoltaic and/or laminate module.

In the embodiment of a curved lower edge the height of the rib increases, in direction along the lateral edge, at least within a section of the rib.

Such a configuration accounts for the fact that the roof panels are mounted in overlapping manner, i.e. an upper roof panel partially overlaps with the neighbouring lower roof panel (as it is known for classic roof tiles). The average (or large-scale) inclination of the roof is slightly larger than the inclination of each roof panel, since the lower edge of a roof panel is arranged above the neighbouring roof panel it overlaps with, which is arranged further below. In order to account for optimal tightness, particularly waterproofness, the rib(s) according to the invention is designed such, that its lower edge is inclined with respect to the bottom or top surface of the module (usually bottom and top surface of the module are essentially parallel to each other).

In a preferred embodiment the roof panel comprises at least two ribs fixedly connected to the photovoltaic and/or laminate module and transversely, preferably perpendicularly, projecting away from the bottom surface, wherein a first rib of the at least two ribs extends along a first lateral edge of the photovoltaic and/or laminate module and a second rib of the at least two ribs extends along a second lateral edge of the photovoltaic and/or laminate module, wherein the second lateral edge is opposed to the first lateral edge.

In a preferred embodiment the at least one rib, preferably each rib of the at least two ribs, is distanced from its associated lateral edge inwardly, preferably by a distance of at least 2 cm, preferably of at least 4 cm. The distances of the ribs may be chosen asymmetrically so that when two panels are placed on top of each other with their respective ribs facing towards the other panel, their respective ribs do not overlap. In this way the panels can be stacked in a space saving manner.

In a preferred embodiment the photovoltaic and/or laminate module has transverse edges extending between the lateral edges, wherein in the mounting condition of the roof panel one of the transverse edges is the upper edge and the other of the transverse edges the lower edge.

In a preferred embodiment the height of the at least one rib, preferably of each of the at least two ribs, increases in direction from the upper edge towards the lower edge, such that the distance between the lower edge of the at least one rib and the bottom surface of the photovoltaic and/or laminate module increases in direction from the upper edge towards the lower edge.

In a preferred embodiment the photovoltaic module comprises an arrangement of at least one, preferably a plurality of photovoltaic elements.

In a preferred embodiment a first area located between the arrangement of photovoltaic elements and the upper edge of the photovoltaic module is free from photovoltaic elements and a second area located between the arrangement of photovoltaic elements and the lower edge of the photovoltaic module is free from photovoltaic elements, and wherein the first area is larger, preferably at least two times larger than the second area.

In this embodiment the (transversal) edge adjacent the first area is the upper edge, and the opposite edge—adjacent the second area—is the lower edge.

In a preferred embodiment the minimum height of the at least one rib amounts between 1 cm and 10 cm and/or wherein the maximum height of the rib amounts between 3 cm and 30 cm, the maximum height being larger than the minimum height and/or wherein the absolute difference between the maximum height and the minimum height amounts between 5 mm and 20 mm.

The height preferably varies linearly along the lateral edge, meaning that bottom edge is straight and/or its surface planar. In that case the angle between the lower edge of the at least one rib and the bottom surface and/or the top surface of the photovoltaic module amounts between 0.2° and 3°.

In another preferred embodiment the lower edge of the at least one rib is curved, especially curved toward the photovoltaic module. This is especially beneficial if the supporting profile the photovoltaic module rests on is curved, preferably the supporting profile having the same curvature as the photovoltaic module. Preferably, the supporting profile has a section with a constant curvature so that one type of roof panels (with the same curvature of the rib) can be used for this roof section. Also this makes it easier to manufacture the curved supporting profiles.

In a preferred embodiment the at least one rib, preferably each of the at least two ribs, ends at a distance before the lower edge of the photovoltaic and/or laminate module and/or wherein the at least one rib has in the area of the lower edge a recess or space for accommodating the upper portion of an adjacent roof panel. In that way roof panels can overlap without the ribs getting in the way. The rib may be configured such that the top of such rib fits exactly with the bottom of another such rib or even interlocks therewith. This renders the gap between two ribs even more waterproof. Especially if the ribs of two overlapping roof panels overlap in the direction perpendicular to the direction the supporting profile extend in.

In a preferred embodiment the at least one rib is formed as a portion of a profile, wherein the profile has a mounting portion which at least partially engages the bottom surface and/or a lateral edge and/or a transverse edge and/or the top surface of the photovoltaic and/or laminate module.

In a preferred embodiment a surface of the profile has a plurality of protrusions and/or recesses for positioning and/or distancing the roof panel from an adjacent roof panel, especially from (a) horizontally neighbouring panel(s). The protrusions make sure that the edges of the panels do not touch each other, what could lead to damage over time. Recesses could help align the panels or keep them at the desired distance.

In a preferred embodiment the mounting portion of the profile extends—in a direction along the lateral edge associated with the rib—beyond the portion forming the rib, preferably up to the upper edge and/or lower edge of the photovoltaic module. In this way a defined gap can be established between the modules for ventilation.

In a preferred embodiment the profile at least partially extends beyond and/or covers and/or encloses the lateral edge associated with the rib formed as a portion of that profile. This protects the edges of the panel, preventing damage over time. Recesses could help align the panels or keep them at the desired distance.

In a preferred embodiment at least the lower portion, preferably at least the lower half of the rib(s)—as seen in direction perpendicular to the photovoltaic module—completely lie(s) within the outline of the photovoltaic module. "Lie(s) within the outline" of the photovoltaic module means that the normal projection of at least the lower portion of the rib(s) onto the photovoltaic module does not extend beyond the contour (or outline) of the photovoltaic module. The roof panel can be handled in an easy manner and the transport and packaging capacity is increased since there are no parts protruding away from the flat body of the module. Also the following embodiments contribute to the advantages mentioned.

In a preferred embodiment the rib(s) end(s) at its/their lower edge, the lower edge(s)—as seen in direction perpendicular to the photovoltaic module—completely lie(s) within the outline of the photovoltaic module. In this embodiment the rib has a downward extending portion (i.e. a portion transversely extending away from the bottom surface of the photovoltaic module). The downward extending portion ends in the lower edge of the rib; and the lower edge is the end of the rib (i.e. there is no continuation). In the mounted state the lower edge of the rib rests within the supporting profile of the roof assembly.

In a preferred embodiment the rib(s)—as seen in direction perpendicular to the photovoltaic module—do not extend more than 3 cm beyond the outline of the photovoltaic module. Here, only the upper portion, i.e. the mounting portion of the rib, may extend beyond the outline of the photovoltaic module.

In a preferred embodiment the outermost rib(s) do not extend more than 4 cm, preferably more than 2 cm, beyond the outline of the photovoltaic module—as seen in direction perpendicular to the photovoltaic module.

In a preferred embodiment no part of the roof panel extends more than 4 cm, preferably more than 2 cm, beyond the outline of the photovoltaic module—as seen in direction perpendicular to the photovoltaic module.

In such embodiments also material required for the roof panel may be reduced (see also following embodiments).

In a preferred embodiment the rib(s) of the roof panel has/have a simple structure, i.e. the rib has a downward extending portion and the rib ends at the lower edge of the downward extending portion. The rib may have an I-shaped or a T-shaped or an inverted L-shaped cross-section. In contrast to prior art it is preferred that the inventive rib does not have a complicated structure, particularly no structure such as a (water) channel-type structure for draining rain or holding neighbouring roof panels. The function of taking up rain water is solved by the supporting profile which, however, is a separate component of an inventive roof.

In a preferred embodiment the rib(s) with its/their downward extending portion is/are distanced from its/their associated lateral edge inwardly, preferably by a distance of at least 2 cm, preferably of at least 4 cm.

In a preferred embodiment the bottom surface of the photovoltaic and/or laminate module is made of a planar sheet of material, preferably fibre reinforced material, such as glass, polymer and/or ceramic and/or wherein the at least one rib is made of metal and/or wood and/or a polymer, preferably containing any of polyethylene, polypropylene, low-density polyethylene, high-density polyethylene, nylon or any combination thereof, preferably containing reinforcement fibres and/or flame retardants. The rib preferably is a solid piece of material.

In a preferred embodiment adjacent roof panels are arranged in overlapping manner, wherein preferably their lateral edges are aligned such, that at least two of their respective ribs, preferably all of their respective ribs, extend in a common plane and/or wherein preferably the ribs of the adjacent roof panels align with each other in the direction of the longitudinal extension of the ribs.

In a preferred embodiment a protecting means is arranged in an end region of the at least one rib, preferably in the end region facing the lower edge of the photovoltaic and/or laminate module, wherein preferably the protecting means comprises at least one elastic and/or deformable and/or spring-type element. This protecting means should engage with an adjacent roof panel or rib thereof so that movement of the roof panels, e.g. due to loads such as wind or snow, can be absorbed.

In a preferred embodiment the at least one rib, preferably each of the at least two ribs, extends essentially parallel to the lateral edge along which the rib extends.

In a preferred embodiment the at least one rib, preferably each of the at least two ribs, is non-detachably connected and/or glued, molten, connected ultra-sonically or by form-locking to the photovoltaic module. Also ribs may extend beyond the outer hull of the roof panel to engage an inner portion of the roof panel or it may be an integral part of that outer hull.

In a preferred embodiment more than two ribs are provided on one roof panel.

In a preferred embodiment not all ribs are inserted into a supporting profile. Such ribs serve to make the module stiffer.

The object is also achieved with a roof assembly or roof comprising
longitudinal supporting profiles inclined with respect to the horizontal, and
a plurality of roof panels supported by the supporting profiles, characterized in that the roof panels are roof panels according to the invention, wherein the roof panels are mountable or mounted such, that the ribs of the roof panels are supported by the supporting profiles.

As used in this document, "roof assembly" means that the component parts such as roof panels and supporting profiles are not yet assembled into a roof.

In a preferred embodiment the length of the supporting profiles is at least 2 times, preferably at least 3 times, larger than the length of a roof panel. With other words the supporting profiles each extends continuously along at least two, preferably along at least three roof panels. The length of a roof panel is the extension of the roof panel in the direction parallel to the rib(s).

Preferably, at least one of the ribs of neighbouring roof panels lies within the same supporting profile.

Each supporting profile is preferably made of one piece of material.

In a preferred embodiment the supporting profile in a cross-sectional view having side wall portions and a bottom portion, wherein ribs of (horizontally or vertically) adjacent roof panels are arranged between the side wall portions of the same supporting profile, wherein preferably the ribs abut against the bottom portion, wherein preferably the supporting profile has U-shaped cross-section. Preferably, the height of the side wall portions is smaller than the minimum height of the ribs of the roof panels so that the ribs rest on the bottom of the supporting profile. Due to the simple U-shaped form, the profile can be easily manufactured or even a standard profile can be used, thus saving costs.

In a preferred embodiment a channel is formed between two neighbouring ribs (within the supporting profile), preferably to let water flow down the roof assembly or roof. The channel is formed by the bottom portion of the supporting profile and the ribs of adjacent roof panels. With other words: The ribs form the side walls of the channel and the bottom portion of the supporting profile forms the bottom of the channel. The channel allows (rain) water, dirt, particles and/or leaves to be transported within the channel down the roof (assembly).

Since the ribs can be freely positioned in the supporting profile (at least in horizontal direction), the profiles do not have to be mounted very accurately. Since only the gap between adjacent panels will be visible only this gap needs to be accurate. Where the supporting profile is located underneath the roof panels is therefore not relevant to the appearance of the roof. In order to achieve this, the supporting profile should be made wider that needed to merely accommodate two adjacent ribs of two neighbouring roof panels with the desired gap between them.

In a preferred embodiment roof panels arranged along the supporting profile overlap with each other, wherein roof panels are covered in the region of their upper edges by the lower edges of adjacent roof panels.

In a preferred embodiment in the overlapping area of adjacent roof panels at least one spacer is provided between the adjacent roof panels, at least one of the spacers preferably being an integral part of a rib. In this way proper ventilation can be guaranteed.

In a preferred embodiment the supporting profiles extend essentially parallel to each other and/or wherein the supporting profiles are mounted on transverse beams, preferably extending essentially horizontally.

In order to render the roof waterproof, the ribs preferably have no areas that are penetrable for water, at least not above the adjacent side wall portion of the supporting profile it extends next to.

In a preferred embodiment the ribs with their lower edge abut—preferably in a gapless manner—against the bottom portion of the supporting profile. The ribs are in direct contact with the surface of the bottom portion. The direct (or gapless) contact prevents or makes it more difficult for water and/or other particles to get into other areas of the supporting profile and thus from running through the roof.

In a preferred embodiment the ribs have a—preferably planar—bottom surface, wherein the ribs rest with their (planar) bottom surface on a—preferably planar—surface of the bottom portion of the supporting profile. In such a way planar contact surfaces are formed further impeding the ingress of water.

In a preferred embodiment the force of gravity caused by the weight of the roof panels is directly introduced via the bottom surface of the ribs into the surface of the bottom portion. The advantage of this embodiment consists in the fact, that there is no need for special mounting structures. Moreover, the abutment force of the rib against the bottom portion is increased. The abutment force continuously increases the mechanical contact with the bottom portion along the rib and thus the tightness (which further impedes the ingress of water).

In a preferred embodiment the space extending between two neighbouring ribs within a supporting profile is free space, preferably forming a channel. With this embodiment also larger amounts of (rain) water can be drained between the ribs of adjacent roof panels.

In a preferred embodiment the surface of the bottom portion facing the ribs extends between the ribs in a planar manner. According to this embodiment supporting profile of simple construction may be used. In the most preferred embodiment its cross-section has side walls and a bottom portion, the latter connecting the side wall. It is preferred if the space between the side walls is free from any structures, just accommodating the ribs of adjacent roof panels.

In another embodiment the lower edge of the ribs may be curved, especially curved toward the photovoltaic module. In that case it is preferred if the supporting profile (the photovoltaic module rests on) is also curved, preferably the supporting profile having the same (i.e. complementary) curvature as the ribs. Preferably, the supporting profile has a section with a constant curvature so that one type of roof panels (with the same curvature of the rib) can be used for this roof section.

The invention also relates to a method for installing a roof assembly or a roof comprising the steps:

a. mounting at least two, preferably a plurality of, supporting profiles at a distance from each other and essentially parallel to each other, wherein preferably the at least two, preferably the plurality of, supporting profiles are mounted on an under construction, preferably on horizontal bars;

b. placing roof panels according to the invention on the supporting profiles such that the ribs of the roof panels are arranged within the supporting profiles; and c. optionally fastening the roof panels to the supporting profiles.

In the assembled state the ribs of neighbouring roof panels lie within the same supporting profile.

DESCRIPTION OF THE DRAWINGS

Further embodiments of the invention are indicated in the figures and in the dependent claims. The list of reference marks forms part of the disclosure. The invention will now be explained in detail by the drawings. In the drawings:

FIG. 4 schematically shows a cross sectional view of two roof panels and a supporting profile they rest in.

DETAILED DESCRIPTION OF THE PREFERRED EMBODIMENT

Figure 1:
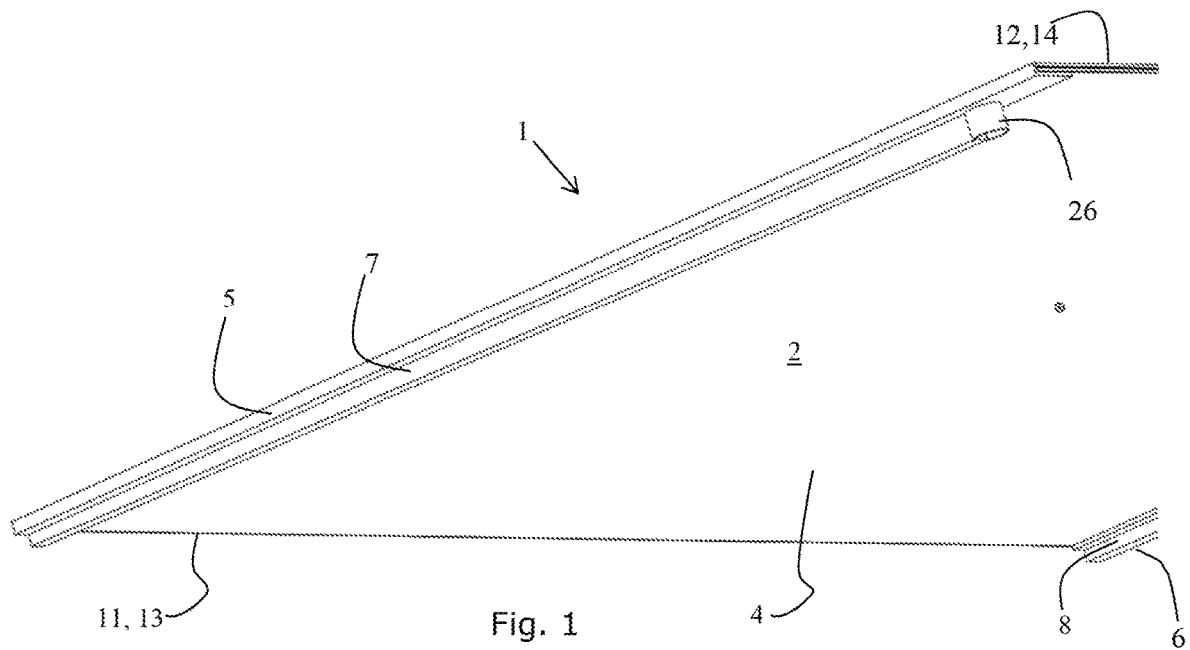
FIG. 1 shows a perspective view of an inventive roof panel from below.

FIG. 1 shows a roof panel 1 from below comprising a photovoltaic module 2 and two ribs 7, 8. The ribs 7, 8 are mounted on the bottom surface 4 of module 2 along its lateral edges 5, 6.

Figure 3:
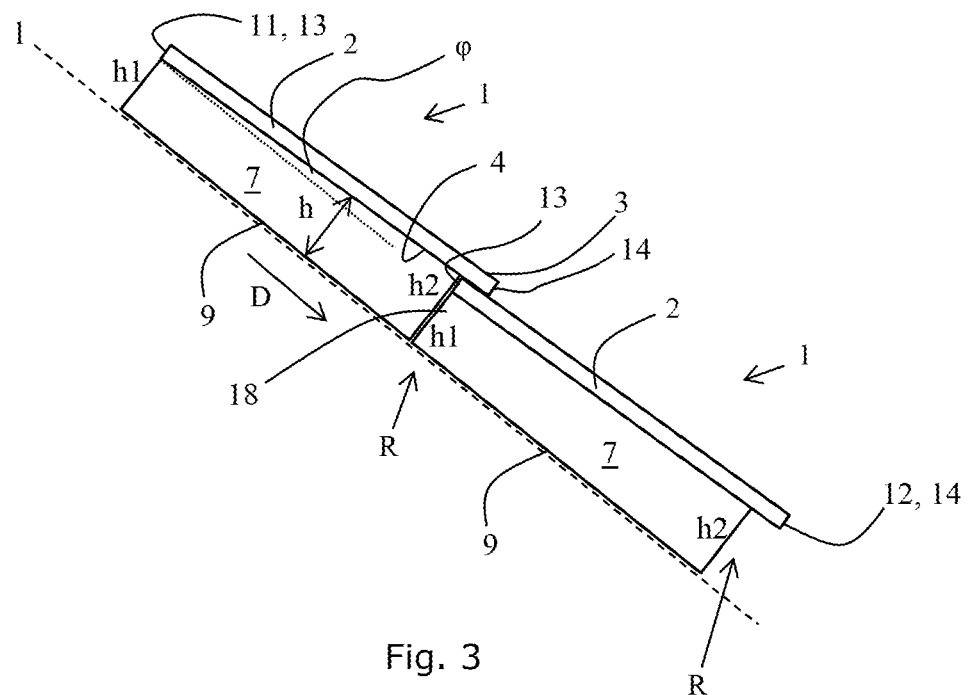
FIG. 3 schematically shows a side view of two overlapping roof panels.

As can be seen in FIG. 3, ribs 7 are higher near the lower edge 14 of the module 2 than near the upper or transverse edge 13 thereof. The lower edge 9 of rib 7 makes an acute angle φ with the bottom surface 4 and/or the top surface 3 of the photovoltaic and/or laminate module 2. The height h of the at least one rib 7 increases, in direction D along the lateral edge 5, 6, such that the lower edge 9, 10 of the at least one rib 7 is inclined with respect to the bottom surface 4 and/or the top surface 3 of the photovoltaic module 2.

Figure 4:
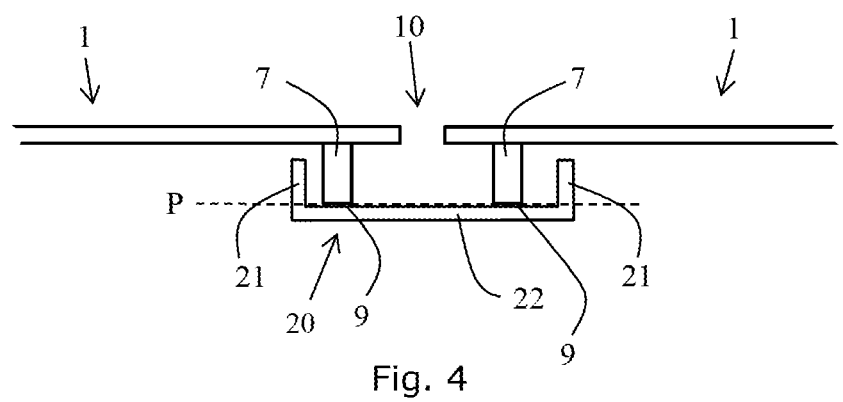

As mounted, the lower edges 9 of ribs 7 lie in straight line I. This can also be seen in FIG. 2. Here the ribs 7 lie in a supporting profile 20. FIG. 4 shows a cross sectional view of this situation perpendicular to the direction the supporting profile 20 extends in. Clearly the lower edges 9 of ribs 7 now lie in a single plane P extending along the bottom portion 22 of the supporting profile 20.

Figure 2:
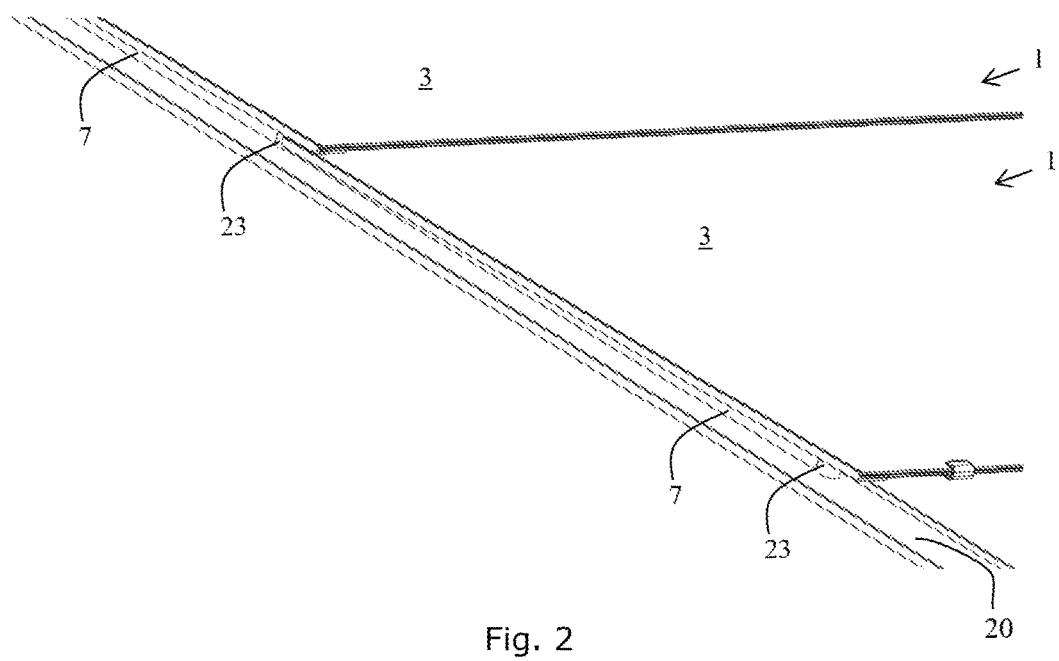
FIG. 2 shows a pan view of two overlapping roof panels resting on a supporting profile.

In FIG. 2 the ribs 7 of the roof panels 1 shown have protecting means such as deformable elements 23 so that the ribs can expand and move e.g. under the influence of heat or wind load.

As can be seen in FIG. 4, supporting profile 20 contains two side wall portions 21 and a bottom portion 22 thereby forming an U-shape. All roof panels 1 have one rib 7 extending into supporting profile 20, the ribs 7 abutting against bottom portion 22, thus building a channel for the water to run off between the ribs 7 of adjacent roof panels 1.

Water that passes through the gap 10 between two photovoltaic modules 2 will fall into supporting profile 20 and flow down along the supporting profile 20. In order to penetrate the roof, water would have to move in horizontal direction over the bottom portion 22 of the supporting profile 20, underneath ribs 7 and up the side wall portion 21 of supporting profile 20. Clearly it is virtually impossible for water to pass this barrier.

As can be seen from FIG. 4 the ribs 7, 8 of adjacent roof panels 1 abut with their lower edge—in a gapless manner—against the bottom portion 22 of the supporting profile 20. The ribs 7, 8 may have a planar bottom surface, wherein the ribs 7, 8 rest with their planar bottom surface on a planar surface of the bottom portion 22 of the supporting profile 20.

The lower edge or bottom surface of the rib 7, 8 may be a continuous straight surface, such that the rib abuts along its entire length against a (straight) supporting profile 20 of the roof construction. If the supporting profile has a constant curvature, at least in the range where the solar modules extend, the ribs should have a comparable (or complementary) curvature.

By the construction shown in FIG. 4, the force of gravity caused by the weight of the roof panels 1 is directly introduced via the bottom surface of the ribs 7, 8 into the surface of the bottom portion 22 (i.e. from surface to surface).

The space extending between two neighbouring ribs 7, 8 (i.e. between ribs of adjacent roof panels) within the supporting profile 20 is free space, preferably forming a channel—as already mentioned above. The surface of the bottom portion 22, i.e. the surface facing the ribs 7, 8, extends between the ribs 7, 8 in a planar manner (see FIG. 4).

FIG. 4 further shows that the exact location of ribs 7 in supporting profile 20 in horizontal direction is not important since only the relative positions of the roof panels 1 can be seen from outside. Consequently, the mounting of supporting profiles 20 is not very critical. An accuracy of a couple of centimetres is all that is needed so that the ribs extend into the supporting profile 20. This makes the mounting of the supporting profiles 20 easy.

Going back to FIG. 3, it is shown that ribs 7 have a smaller height h1 near the upper or transverse edge 11, 13 of the module 2 as compared to their height h2 near the lower or transverse edge 12, 14 of the module 2. In the shown embodiment the ribs 7 have a recess R near the lower edge 14 for accommodating the upper portion 18 of an adjacent roof panel 1.

Figure 13:
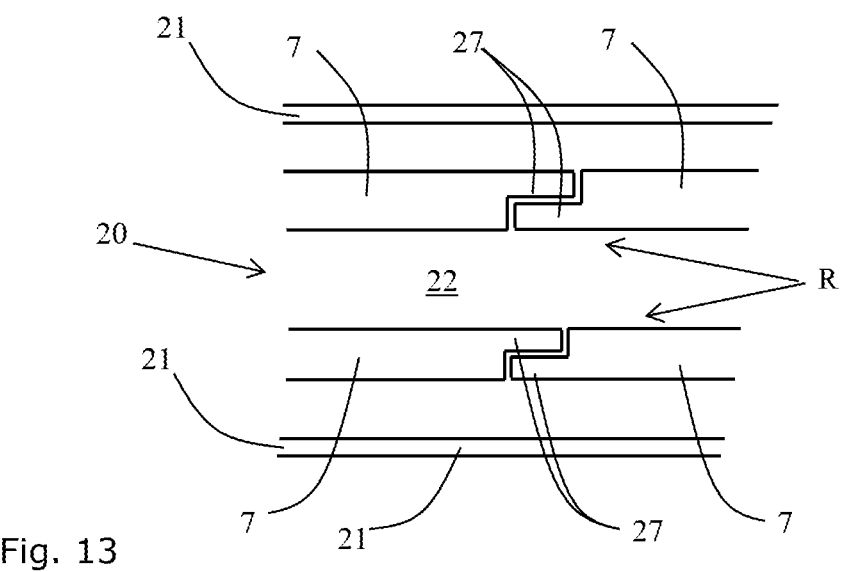
FIG. 13 schematically shows interlocking of ribs that prevent moisture ingress.

In FIG. 13 four ribs 7 in a supporting profile 20 are shown from the top. The recesses R of the ribs 7 here form interlocking portions 27 so that the lateral movement of water (in vertical direction in this figure) from bottom portion 22 to inside the roof is inhibited. Moreover, the ribs of two overlapping roof panels overlap in the horizontal direction perpendicular to the direction the supporting profile 20 extends in. The space between the interlocking portions 27 is exaggerated for clarity. Normally, there would be hardly any space at all.

Figure 5:
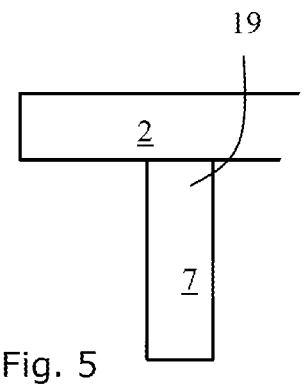
FIGS. 5-10 schematically show a front view of a lateral side of a roof panel.

FIGS. 5 through 11 schematically show possible features of embodiments according to the invention:

FIG. 5 shows a rib 7 in its most elementary form.

Figure 6:
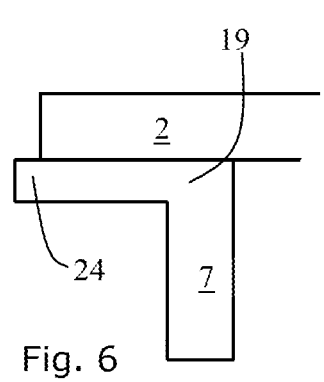

FIG. 6 shows a rib 7 with a protruding portion 24 that prevents two adjacent modules 2 from touching.

Figure 7:
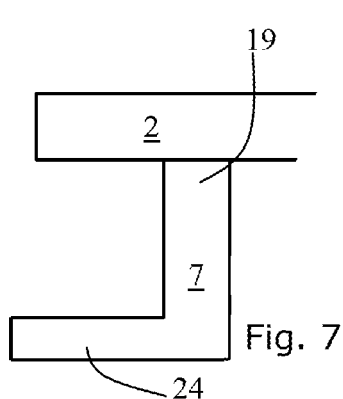

FIG. 7 shows a rib 7 with a protruding portion 24 that prevents two modules 2 from touching, the protruding portion now being on the lower edge of the rib.

Figure 8:
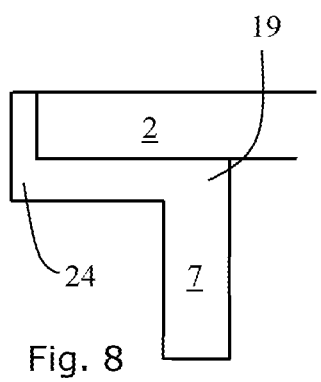

FIG. 8 shows a rib 7 with a protruding portion 24 that protects the module edge even more.

Figure 9:
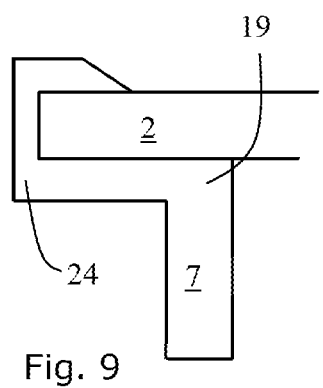
Figure 10:
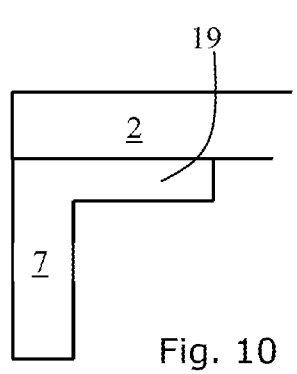

FIG. 9 shows a rib 7 with a protruding portion 24 that protects the module edge and holds the module.

FIG. 9 shows a rib 7 with no protruding portion 24 that makes the channel between two adjacent panels small.

Figure 11:
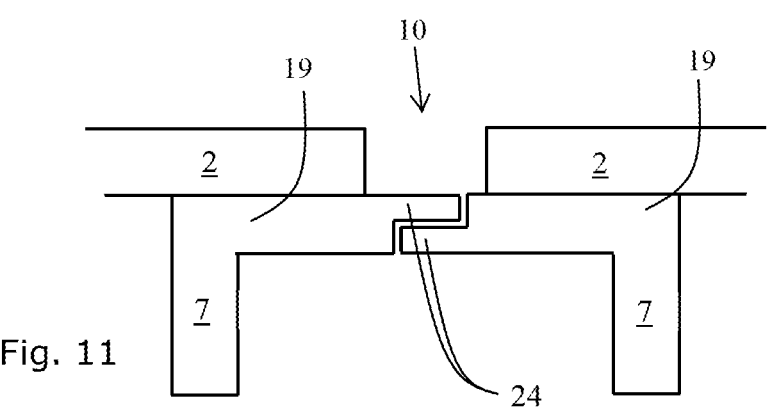
FIG. 11 schematically shows two overlapping adjacent ribs.

FIG. 11 shows two ribs 7 with protruding portions 24 that interlock, thus at least partially closing the gap 10.

All ribs in FIGS. 5 through 11 are mounted to the module with their mounting portion 19.

Figure 12:
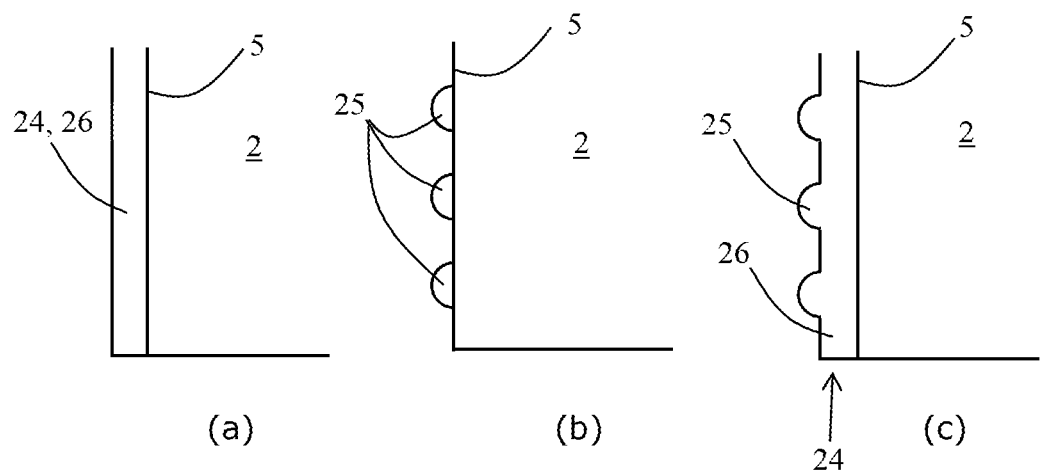
FIG. 12a-c schematically show top a view of lateral sides of a roof panel.

As can be seen in FIG. 12, the protruding portion does not have to be identical along the lateral edge 5 of the roof panel:

FIG. 12 (a) shows a protruding portion 24 that is the same along lateral edge 5.

FIG. 12 (b) shows a protruding portion 24 that is formed by knobs 25.

FIG. 12 (c) shows a protruding portion 24 that has a continuous portion 26 and knobs 25.

Figure 14:
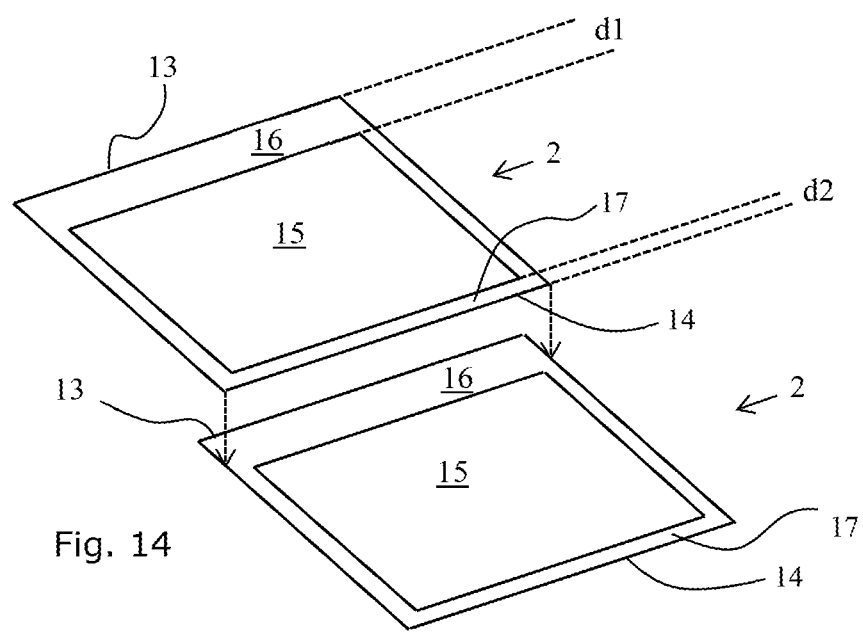
FIG. 14 shows how the photovoltaic elements may be located in the modules.

FIG. 14 shows two modules 2 with arrangements of photovoltaic elements 15. The arrangements of photovoltaic elements may contain any number of solar cells of any type such as crystalline or thin film.

A first area 16 located between the arrangement of photovoltaic elements 15 and the upper or transverse edge 13 of the photovoltaic module 2 is free from photovoltaic elements. A second area 17 located between the arrangement of photovoltaic elements 15 and the lower edge 14 of the photovoltaic module 2 is free from photovoltaic elements as well. The first area 16 is larger than the second area 17 and is used to fit under an overlapping module 2 as indicated by the dashed arrows. The distance d1 between the arrangement of photovoltaic elements 15 and the upper edge 13 of the photovoltaic module 2 is larger than the distance d2 arrangement of photovoltaic elements 15 and the lower edge 14 of the photovoltaic module 2.

Although the foregoing embodiments have been described on the basis of roof panels comprising a photovoltaic module, it should be mentioned that the invention is also applicable to laminate modules (with or without photovoltaic elements or solar cells), thus also including so-called blind modules.

Figure 15:
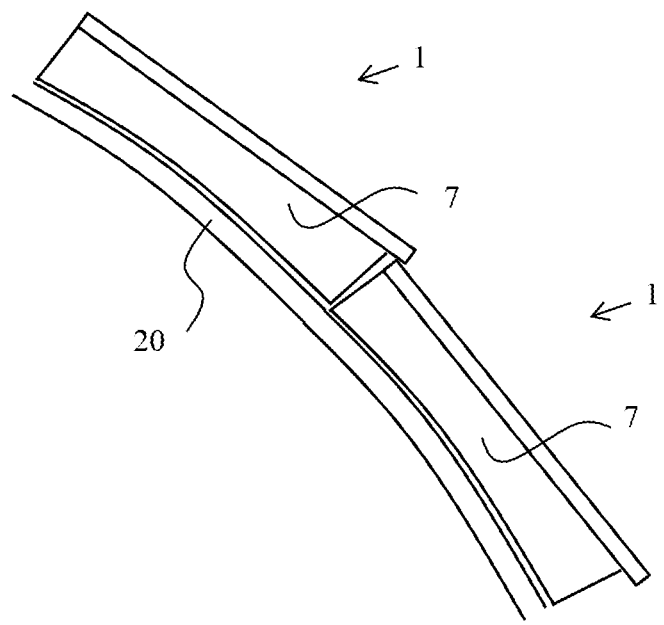
FIG. 15 shows a roof assembly with curved ribs and a curved supporting profile.

FIG. 15 shows an alternative embodiment of the inventive roof assembly with a curved supporting profile 20 and roof panels 1 with ribs 7 that have the essentially same curvature as the supporting profile 20. The lower rib edge may be curved relative to the top or bottom surface of the photovoltaic module 2, i.e. in the present embodiment the lower rib edge is concave curved. This embodiment has all the advantages of the invention while allowing roofs to be curved.

The invention is not restricted to these embodiments. Other variants will be obvious for the person skilled in the art and are considered to lie within the scope of the invention as formulated in the following claims. Individual features described in all parts of the above specification, particularly with respect to the figures may be combined with each other to form other embodiments and/or applied mutatis mutandis to what is described in the claims and to the rest of the description, even if the features are described in respect to or in combination with other features.

| List of reference signs | |
| --- | --- |
| 1 | Roof panel |
| 2 | Photovoltaic module |
| 3 | Top surface |
| 4 | Bottom surface |
| 5 | Lateral edge |
| 6 | Lateral edge |
| 7 | Rib |
| 8 | Rib |
| 9 | Lower edge of a rib |
| 10 | Gap |
| 11 | Transverse edge |
| 12 | Transverse edge |
| 13 | Upper edge |
| 14 | Lower edge |
| 15 | Arrangement of photovoltaic elements |
| 16 | First area |
| 17 | Second area |
| 18 | Upper portion |
| 19 | Mounting portion |
| 20 | Supporting profile |
| 21 | Side wall portion |
| 22 | Bottom portion |
| 23 | Deformable element |
| 24 | Protruding portion |
| 25 | Knobs |
| 26 | Continuous portion |
| 27 | Interlocking portion |
| φ | Angle between lower edge of the rib and the bottom of the photovoltaic module |
| d1 | Distance |
| d2 | Distance |
| D | Direction |
| h | Height |
| h1 | Minimum height |
| h2 | Maximum height |
| I | Distance |
| P | Plane |
| R | Recess |

What is claimed is:

1. A roof assembly or roof, comprising:
longitudinal supporting profiles inclined with respect to a horizontal ground surface, and
a plurality of roof panels supported by the longitudinal supporting profiles,
wherein the plurality of roof panels each comprise:
   a photovoltaic module having a top surface, a bottom surface, and lateral edges,
   at least one rib fixedly connected to the photovoltaic module, said at least one rib projecting away from the bottom surface and extending along the lateral edges of the photovoltaic module,
wherein each of the longitudinal supporting profiles comprises side wall portions and a bottom portion,
wherein the ribs of adjacent ones of the roof panels are adjustably positioned between and not fixedly connected to the side wall portions of a corresponding one of the longitudinal supporting profiles, and
wherein a lower edge of each of the ribs abuts the bottom portion of the corresponding one of the longitudinal supporting profiles.

2. The roof assembly or roof according to claim 1,
wherein a height of the at least one rib increases in a direction along the lateral edges, such that the lower edge of the at least one rib is inclined or curved with respect to the bottom surface or the top surface of the photovoltaic module.

3. The roof assembly or roof according to claim 1,
wherein the roof panel comprises at least two ribs fixedly connected to the photovoltaic module and transversely projecting away from the bottom surface,
wherein a first rib of the at least two ribs extends along a first lateral edge of said lateral edges of the photovoltaic module and wherein a second rib of the at least two ribs extends along a second lateral edge of said lateral edges of the photovoltaic module, wherein the second lateral edge is opposite to the first lateral edge, both ribs having lower edges that are inclined with respect to the bottom surface or the top surface of the photovoltaic module.

4. The roof assembly or roof according to claim 1,
wherein the photovoltaic module has transverse edges extending between the lateral edges,
wherein, in a mounting condition of the roof panel, one of the transverse edges is an upper edge and the other of the transverse edges is a lower edge, wherein a height of the at least one rib increases in a direction from the upper edge towards the lower edge, such that a distance between the lower edge of the at least one rib and the bottom surface of the photovoltaic module increases in the direction from the upper edge towards the lower edge.

5. The roof assembly or roof according to claim 1,
wherein the photovoltaic module comprises an arrangement of at least one photovoltaic element,
wherein a first area located between the arrangement of at least one photovoltaic element and an upper edge of said lateral edges of the photovoltaic module is free from any photovoltaic elements and wherein a second area located between the arrangement of at least one photovoltaic element and a lower edge of said lateral edges of the photovoltaic module is free from any photovoltaic elements, and
wherein the first area is larger than the second area or wherein a distance between the arrangement of at least one photovoltaic element and the upper edge of said lateral edges of the photovoltaic module is larger than a distance between the arrangement of at least one photovoltaic element and the lower edge of said lateral edges of the photovoltaic module.

6. The roof assembly or roof according to claim 1,
wherein a minimum height of the at least one rib amounts to between 1 cm and 10 cm or wherein a maximum height of the rib amounts to between 3 cm and 30 cm, the maximum height being larger than the minimum height, or wherein an absolute difference between the maximum height and the minimum height amounts to between 5 mm and 20 mm, or wherein an angle between the lower edge of the at least one rib and the bottom surface or the top surface of the photovoltaic module amounts to between 0.2° and 3°.

7. The roof assembly or roof according to claim 1,
wherein the at least one rib ends at a distance before a lower edge of said lateral edges of the photovoltaic module, or
wherein the at least one rib has, in an area of the lower edge of said lateral edges of said photovoltaic module, a recess or space for accommodating an upper portion of an adjacent roof panel of said plurality of roof panels.

8. The roof assembly or roof according to claim 1,
wherein the at least one rib has a mounting portion which at least partially engages the bottom surface or the lateral edge or a transverse edge or the top surface of the photovoltaic module,
wherein the mounting portion at least partially extends beyond or covers or encloses the lateral edge associated with the rib.

9. The roof assembly or roof according to claim 1,
wherein at least a lower portion of the at least one rib, in a direction perpendicular to the photovoltaic module lies completely within an outline of the photovoltaic module, or
wherein the at least one rib ends at the lower edge thereof, the lower edge, in the direction perpendicular to the photovoltaic module lies completely within the outline of the photovoltaic module, or
wherein the at least one rib, in the direction perpendicular to the photovoltaic module, extends no more than 3 cm beyond the outline of the photovoltaic module, or
wherein any outermost ribs, in the direction perpendicular to the photovoltaic module, extend no more than 4 cm beyond the outline of the photovoltaic module, or
wherein the roof panel, in the direction perpendicular to the photovoltaic module, extends no more than 4 cm beyond the outline of the photovoltaic module, or
wherein the at least one rib comprises a downward extending portion, the downward extending portion being distanced from an associated lateral edge of said lateral edges of the photovoltaic module inwardly by a distance of at least 2 cm.

10. The roof assembly or roof according to claim 1,
wherein the bottom surface of the photovoltaic module is made of a planar sheet of fibre reinforced material, or
wherein the at least one rib comprises metal or wood or a polymer,
said at least one rib further comprising polyethylene, polypropylene, low-density polyethylene, high-density polyethylene, nylon, or any combination thereof.

11. The roof assembly or roof according to claim 1,
wherein the roof panel is placed with an adjacent roof panel of said plurality of roof panels in an overlapping manner, wherein lateral edges are aligned such that at least two corresponding ribs extend in a common plane, or
wherein ribs of adjacent roof panels of said plurality of roof panels align with each other in a direction of the longitudinal extension of the ribs, or
wherein two roof panels overlap in such a way that at least two ribs associated with one lateral edge of said lateral edges of the photovoltaic module extend in one plane, and
wherein a lower edge of at least two ribs associated with one lateral edge lie in one line or plane.

12. The roof assembly or roof according to claim 1,
wherein the roof panels are mountable or mounted such that the at least one rib of each of the roof panels extend into or are supported by the supporting profiles,
wherein a length of the supporting profiles is at least 2 times larger than a length of a roof panel of said plurality of roof panels,
wherein at least one of the ribs of neighboring roof panels of said plurality of roof panels lies within the same longitudinal supporting profile,
wherein space extending between two neighboring ribs within a longitudinal supporting profile is free space and forms a channel, and
wherein the longitudinal supporting profile is made of one piece of material.

13. The roof assembly or roof according to claim 12,
wherein the channel is formed between two neighbouring ribs such that water flows down the roof assembly or roof.

14. The roof assembly or roof according to claim 12,
wherein a lower edge of each of the ribs abuts in a gapless manner against the bottom portion of the longitudinal supporting profile,
wherein the ribs have a planar bottom surface, wherein the bottom surfaces of the ribs rest on a planar surface of the bottom portion of the longitudinal supporting profile, or
wherein the lower edge or bottom surface of the rib is a continuous straight surface, such that the rib abuts along said rib's entire length against the longitudinal supporting profile of the roof assembly or roof.

15. The roof assembly or roof according to claim 12,
wherein a force of gravity caused by a weight of the roof panels is directly introduced via the bottom surface of the ribs into a surface of the bottom portion.

16. The roof assembly or roof of claim 12, wherein a height of the side wall portions is smaller than a minimum height of the ribs of the roof panels such that the ribs rest on a bottom of the supporting profile.

17. A method of installing the roof assembly or roof according to claim 1, comprising the steps of:
mounting at least two supporting profiles at a distance from each other and parallel to each other, and
placing roof panels on the supporting profiles such that ribs of the roof panels are arranged within the supporting profiles,
wherein the ribs of neighboring roof panels of said roof panels lie within the same supporting profile, and
wherein a lower edge of each of the ribs abuts a bottom portion of a corresponding one of said at least two supporting profiles.

\* \* \* \* \*